United States Patent
Onishi et al.

(10) Patent No.: US 8,103,439 B2
(45) Date of Patent: Jan. 24, 2012

(54) PORTABLE NAVIGATION TERMINAL AND PROGRAM

(75) Inventors: Keisuke Onishi, Tokyo (JP); Shin Kikuchi, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 481 days.

(21) Appl. No.: 11/579,607

(22) PCT Filed: Apr. 27, 2005

(86) PCT No.: PCT/JP2005/007963
§ 371 (c)(1), (2), (4) Date: Nov. 3, 2006

(87) PCT Pub. No.: WO2005/109378
PCT Pub. Date: Nov. 17, 2005

(65) Prior Publication Data
US 2008/0288166 A1    Nov. 20, 2008

(30) Foreign Application Priority Data
May 7, 2004  (JP) ................ 2004-139125

(51) Int. Cl.
*G01C 21/00* (2006.01)
(52) U.S. Cl. ........ 701/200; 701/209; 345/619; 340/990; 340/995.1; 340/995.16; 342/357.75
(58) Field of Classification Search .......... 701/200, 701/209; 345/619; 340/990, 995.1, 995.16; 342/357.75
See application file for complete search history.

(56) References Cited

U.S. PATENT DOCUMENTS

| 5,612,881 A * | 3/1997 | Moroto et al. .......... 701/209 |
| 6,285,314 B1 * | 9/2001 | Nagatsuma et al. ..... 342/357.08 |
| 6,321,158 B1 * | 11/2001 | DeLorme et al. ............ 701/201 |

(Continued)

FOREIGN PATENT DOCUMENTS
JP    4-219783 A    8/1992
(Continued)

OTHER PUBLICATIONS

Translation of International Preliminary Report on Patentability of International Application No. PCT/JP2005/007963.

(Continued)

*Primary Examiner* — Hussein Elchanti
*Assistant Examiner* — Redhwan k Mawari
(74) *Attorney, Agent, or Firm* — Westerman, Hattori, Daniels & Adrian, LLP

(57) ABSTRACT

A portable navigation device where a map being displayed on a display section is fixed by performing map stop operation at a portable navigation terminal where an appropriate map is selected and displayed so as to correspond to the speed of movement. A portable navigation terminal (10) has speed detecting means (104) for detecting the speed of movement of the terminal, a map data request/acquisition section (105) for requesting, according to the movement speed detected by the speed detecting mean, different kinds of map data to an information distributing server and acquiring the map data, and an operation section (16) having a map stop button for stopping, at a desired time point during the movement, change in the kind of map displayed on display means. The portable navigation terminal (10) further has manual scroll means (164), a zoom-in button (162), and a zoom-out button (163) that have the function of the map stop button.

4 Claims, 10 Drawing Sheets

U.S. PATENT DOCUMENTS

2002/0099481 A1 * 7/2002 Mori .......................... 701/23

FOREIGN PATENT DOCUMENTS

| JP | 7-271824 | A | 10/1995 |
| --- | --- | --- | --- |
| JP | 09-304087 | A | 11/1997 |
| JP | 2782760 | B2 | 5/1998 |
| JP | 10-170300 | A | 6/1998 |
| JP | 10-222062 | A | 8/1998 |
| JP | 2782760 | B2 | 8/1998 |
| JP | 10-288529 | A | 10/1998 |
| JP | 2002-5670 | A | 1/2002 |
| JP | 2006-5670 | A | 1/2002 |
| JP | 2003-28662 | A | 1/2003 |
| JP | 2003-214860 | A | 7/2003 |
| JP | 2003-329462 | A | 11/2003 |
| JP | 2004-102175 | A | 4/2004 |

OTHER PUBLICATIONS

Office Action issued Jul. 23, 2009 in Corresponding Japanese Patent Application No. 2004-139125.

* cited by examiner

MAP DATA MANAGEMENT TABLE

| LAYER | MAP TYPE | TRAVELING SPEED RANGE |
|---|---|---|
| A | WIDE-RANGE MAP1 | 100KM/H OR GREATER |
| B | MID-RANGE MAP1 | 100KM/H OR LESS 60KM/H OR GREATER |
| C | DETAILED MAP1 | 60KM/H OR LESS 20KM/H OR GREATER |
| D | URBAN AREA MAP1 | 20KM/H OR LESS |

Fig.2

PORTABLE NAVIGATION TERMINAL AND PROGRAM

FIELD OF THE INVENTION

The present invention relates to a portable navigation terminal and program, and more particularly to a portable navigation terminal and a program capable of stopping the automatic scroll function thereof from operating to keep the display of a detailed map fixed including the current position of the portable navigation terminal, if a zoom-in (magnifying) operation is performed on the detailed map including such current position while the portable navigation terminal is traveling at high speed.

RELATED ART

Heretofore, people have customarily relied on an atlas to locate roads, landmarks and addresses when visiting a place for the first time or a destination in an unfamiliar region. In recent times, people have come to depend on car navigation systems, which display guidance or navigation information on a monitor screen when activated, or output audible guidance provided from the navigation system once they enter the vicinity of their destination.

The aforementioned car navigation system, which employs a global positioning system (GPS), receives GPS signals transmitted from a plurality of GPS satellites that travel over the earth via a GPS antenna, and identifies a position by analyzing satellite positions contained in the GPS signals, as well as information regarding the distance between satellites and a receiver, clock information, etc.

There must be at least four GPS satellites in such type of car navigation system. By itself, the GPS generally fixes a certain position with an accuracy of slightly over 10 m, but such position-fixing accuracy can be enhanced by 5 m or less if Differential GPS ("DGPS") is available.

In recent years, the performance of portable communication terminals such as mobile phones and PHS units has dramatically improved as they have become more and more multifunctional. In particular, along with providing telephone communication, the data communication function of such gadgets has expanded to various uses, such that multifarious data communication services are now accessible to users via the Internet. One such example is navigation service, by which not only automobile drivers but ambulatory users of mobile phones as well can access route guidance from their current position to a certain destination.

For example, Japanese Patent No. JP-2003-28662-A (hereinafter, "Patent Document 1") discloses a navigation system using a mobile phone with a GPS function and is configured with a map service center having the following means: means for receiving GPS signals transmitted from a plurality of GPS satellites using a mobile phone equipped with a GPS function and containing a GPS reception section, a GPS control section, and a GPS antenna; means for transmitting packets of data such as position information obtained by analyzing satellite positions, information pertaining to the distance between the satellites and a receiver, clock information, etc. contained in the GPS signals, the telephone number of the mobile phone with GPS function, search information; means for receiving data, detecting positions of the mobile phone with GPS function and the destination, and transmitting to the mobile phone with GPS function, map information on a proper scale, route information, and map data relating to distance, etc.

The present applicant has also disclosed a navigation system using a mobile phone as a terminal in Japanese Patent No. JP-2003-214860-A (hereinafter, "Patent Document 2"). As illustrated in FIG. 10, this navigation system includes a portable terminal (a mobile phone) 1 coupled to a mobile communication network 2 and a data communication service center (an information distribution computer system) 3. The portable terminal 1 makes contact with the data communication service center 3 to receive a type of desired data communication service.

In the case where the portable terminal 1 is a mobile phone or a PHS, the user thereof can initiate or conduct a telephone conversation with a desired destination (a fixed telephone, a mobile phone, a PHS, etc.) via a mobile communication base station or a telephone network through the mobile communication network 2. The data communication service center 3 is configured to provide route navigation service in response to a request from the portable terminal 1 in the following manner.

If the portable terminal 1 issues a request for route search including position information regarding a starting point and a destination, the information distribution computer system of the data communication service center 3 searches for an optimum route from the starting point to the destination using road data stored in a storage means, and temporarily stores relevant route data yielded by the search in the storage means as route guidance data.

If the portable terminal 1 issues a request for display map information specifying position coordinates and route guidance, the information distribution computer system of the data communication service center 3 reads from the storage means, map data in vector format pertaining to an area surrounding the specified position coordinates to be used for map display and the specified route guidance data, and converts such route guidance data into vector data to plot a road in a specific color and incorporate it into the map data, then transmits them to the portable terminal 1 which issued the request.

Although not shown in the drawing, the portable terminal 1 is equipped with a GPS receiver for adjusting its current position as it moves, and carries out GPS positioning operations at predetermined intervals. If a shortage of display map information occurs as a result of GPS positioning operations, the portable terminal 1 issues a request for transmission of display map information to the information distribution computer system of the data communication service center 3.

Also, the information distribution computer system of the data communication service center 3 is equipped with storage means in which the road data (the map data) and other data in respect of landmarks such as buildings, intersection names, and road names etc. for a particular location on the map are stored. Maintenance and updating of data is performed by acquiring the latest data from information distribution computer systems 5 and 6 or the like that distribute maps via the Internet 4.

The map information displayed in the navigation system and the car navigation system ranges from map information covering a wide area to map information that includes detailed information regarding a small area such as an urban area. In general, if a person uses the portable navigation device while traveling by automobile at high speed, for example, the map information covering a wide area is useful, and if the user is traveling on foot, the map information which includes detailed information regarding a small area such as an urban area would be helpful.

The map information covering a wide area pertains to information relating to railroads, highways, principal buildings, etc., whereas map information for an urban area includes, in addition to map information covering a wide area, information regarding narrow roads, intersections, shops, etc., within a determined range. Such various pieces of map information comprising different contents as mentioned above are referred to as map layers, and are arranged in such manner that a proper map may be selected from several maps for appropriate use depending on the circumstances.

As such, automatic selection of the relevant item of map information corresponding to the manner of using the navigation device in particular is made possible and therefore convenient. For example, a navigation device for a mobile unit which attempts to address such a requirement has been disclosed in Japanese Patent No. JP-2002-5670-A (hereinafter, "Patent Document 3"). In connection with such navigation device for a mobile unit, map information storage means for storing and managing map information of different scales and map information retrieval means for extracting necessary map information from the map information storage means are provided in a map center, and the navigation device transmits information on the traveling speed and current position information detected by traveling speed detecting means and current position detecting means, to the map center.

Then, based on the traveling speed and current position information received from the navigation device, the map center extracts from the map information storage means, scaled map information using the map information retrieval means, and transmits it to the navigation device. The navigation device then displays the map information received from the map center along with the current position on a monitor.

Also, a navigation device for vehicle use that displays a map based on corresponding road data in accordance with traveling speed is disclosed in Japanese Patent No. 2,782,760 (hereinafter, "Patent Document 4"), although it does not pertain to a communication navigation system that employs the navigation device and the map center described in Patent Document 3.

The navigation device of Patent Document 4 includes position detecting means for detecting the current position of a vehicle, speed detecting means for detecting the traveling speed of the vehicle, and map display means for performing scroll display of a road map based on the current position detected by the position detecting means in such manner that a vehicle position mark appears at the center of the display. In the case where the amount of information required for conducting the scroll display is greater than a predetermined amount, and the traveling speed detected by the speed detecting means falls within a predetermined range of speed, a map based on road data corresponding to that range of speed is displayed. The road data is separately stored in the navigation device in accordance with the range of speed.

Further, Japanese Patent JP-10-222062-A (hereinafter, "Patent Document 5") discloses a navigation device for a mobile unit that displays the scaled map of a certain area and its environs corresponding to the traveling speed of the mobile unit. This navigation device is provided with position detecting means, speed detecting means, selection means for selecting a scaled map corresponding to the traveling speed of the mobile unit, map data storage means, calculation processing means, and display means.

In such navigation device, the selection means selects a scaled map corresponding to the traveling speed of the mobile unit detected by the speed detecting means. Based on map data read from the map data storage means, the calculation processing means generates display data of a picture map of an area surrounding the position of the mobile unit detected by the position detecting means, on the particular scale selected by the selection means, and displays the relevant map on the display means.

DISCLOSURE OF THE INVENTION

Problems to be Solved

The communication navigation system disclosed in Patent Document 2, in which a mobile phone is employed as a navigation terminal and map and route guidance are distributed from the data communication service center, can be applied in various ways. Depending on the situation, conceivable applications may include a case where a user carries a mobile phone (a portable navigation terminal) while traveling by train or on foot and receives route guidance up to his or her destination; a case where a user receives route guidance up to his or her destination while traveling by automobile; and a case where a user receives distribution of map data when he or she is on board a high-speed transport facility such as a bullet train or the like.

Navigation devices are generally capable of zooming in and out on a displayed map and scrolling the same. There is also a proposed device which is configured to allow both zooming and scrolling functions to take place automatically or manually by giving the user the option to select between an auto mode whereby such functions will automatically ensue and a manual mode by which they would operate upon the user's instruction.

In auto scroll, scroll control is performed on the displayed map so that the current position of the navigation device appears at the center of the display screen, whereas in manual scroll, scroll control is performed on the displayed map based on the instructions given by an operation section on the direction and scope of scrolling to be made. In auto zoom, a map of appropriate size is selected in accordance with the traveling speed of the navigation device, whereas in manual zoom, the map to be displayed is selected based on the scope of zoom instruction originating from the operation section.

Therefore, in the communication navigation system in which the map information is distributed from the information distribution server, if the traveling speed and/or current position of the navigation device triggers the need for the display of new map data as a result of zooming and scrolling operations, the system receives the relevant map data from the information distribution server and displays the map.

As described above, when the portable navigation terminal is in high speed motion, it is preferable that the user has access to a wide-range map, and when it is in low speed motion, e.g., when the user is traveling on foot, it is preferable that the map of an urban area is made available to provide route display or display the current position of the portable navigation terminal. In such manner, the configuration of the navigation devices disclosed in Patent Documents 3, 4 and 5 which are capable of selecting and displaying the appropriate map corresponding to the traveling speed of the navigation device would be convenient.

However, in such type of navigation devices where map switching automatically occurs in accordance with the traveling speed thereof as disclosed in those Patent Documents, the following inconvenience arises. If the user is on board a SHINKANSEN or similar transport facility traveling at high speed and notices a building or event of interest at a certain place and wishes to have access to a map including such building or event and have it displayed on the portable navigation terminal, such would not be possible in the navigation devices disclosed in Patent Documents 3 to 5, since the navigation function thereof causes the map displayed to be automatically switched for another map that corresponds with the traveling speed and the current position which constantly changes on motion. Therefore, the desired map pertaining to the place that has been passed already cannot be obtained.

Further, in the communication navigation device, the transmission of packets of map information, route data, etc., occurs between the information distribution server and the portable navigation terminal. Therefore, in the case where the portable navigation terminal is traveling at high speed, the amount of maps transmitted from the information distribution server to the portable navigation terminal per unit time of transmission increases in accordance with the movement of the current position.

In particular, when a request for zooming in on the map is issued during high-speed travel, scrolling allows immediate downloading of a new map. This brings about an increase in communication load and if there is a large number of users, the information distribution server will not be able to handle all processes required and thus some users would not be satisfactorily served.

After thorough consideration, the inventors of the present application have reached the conclusion that the above problems can be solved if the portable navigation terminal that transmits current position information to an information distribution server and receives map information and route information from the information distribution server to display a map and a route on display means, is equipped with a function that would enable the navigation terminal when it is in operation to keep the map currently displayed fixed on the display screen.

Also, the inventors of the present application have reached the conclusion that the communication overloading problem can be solved if the map information is generated in vector format so that zoom-in and zoom-out operations can take place by conducting zooming process on the map information in respective layers in accordance with a predetermined zoom ratio on the side of the portable navigation terminal.

Accordingly, the present invention aims to solve the above problems and the first object thereof is to provide a portable navigation terminal, a method for displaying a map, and a program therefor, wherein the portable navigation terminal that selects and displays the appropriate map corresponding to the traveling speed is capable of map fixing or map stopping as to fix or maintain the map displayed on the display means to a certain place within the vicinity in which the map-stopping has taken place.

The second object of the invention is to provide a portable navigation terminal, a method for displaying a map, and a program therefor, wherein the portable navigation terminal is capable of reducing the communication load between the information distribution server and the portable navigation terminal.

In the present invention, map fixing or map stopping refers to the state in which map data corresponding to the range of a mesh defined by predetermined latitudes and longitudes containing the current position of the portable navigation terminal has been received and is being displayed on the display means regardless of the current position of the portable navigation terminal, and the map being displayed on the display means at the time when the map-stopping operation is performed or the magnified or reduced version of such map within the range of the mesh thereof continues to be displayed even if the current position of the portable navigation terminal changes, such that switching to new map data including the current position does not occur. It also encompasses the control of automatic or manual scrolling by preventing the creation of requests for distribution of new map data (i.e., stopping the scrolling of a distributed map from extending beyond the mesh thereof).

Means to Solve the Problems

With the intention of solving the above-mentioned problems, the first aspect of the present application relates to a portable navigation terminal that transmits current position information obtained from a GPS system to an information distribution server, receives map information and route information from the information distribution server, and displays a map and a route on display means, wherein the portable navigation terminal comprises: speed detecting means for detecting the traveling speed thereof; a map data request/acquisition section for requesting and acquiring different types of map data depending on the traveling speed detected by the speed detecting means from the information distribution server; an operation means including a map stop button for stopping the change being made in the type of map displayed on the display means at an arbitrary point in time during travel; and map change prohibition means for inhibiting the process of switching the type of map currently displayed on the display means when the map stopping button is operated, whereupon, if the map stop button is operated, the map change prohibition means inhibits the process of switching the map displayed to a map corresponding to the traveling speed of the portable navigation terminal detected by the speed detecting means such that the map being displayed on the display means continues to be displayed without being substituted by another type of map regardless of the traveling speed.

Also, the second aspect of the present application pertains to a program for causing a computer comprising a portable navigation terminal to transmit current position information obtained from a GPS system to an information distribution server, receive map information and route information from the information distribution server, and display a map and a route on display means and execute the following processes: detect the traveling speed of the portable navigation terminal; request and acquire different types of map data from the information distribution server depending on the traveling speed detected by the speed detecting means; and inhibit switching of the type of map displayed on the display means if the map stopping button is operated, regardless of the speed detected by the speed detecting means.

Also, the third aspect of the present application pertains to a portable navigation terminal that receives map data from an information distribution server while switching the various layers of map data in accordance with the traveling speed detected by the speed detecting means and displays a map, wherein the portable navigation terminal comprises: display means; a map data management table in which the traveling speed that serves as switching criterion is set out for each type of map based on the map data in each layer; auto-zoom means for automatically selecting the type of map to be displayed on the display means based on the map management table; auto-scroll means for continually displaying the current position of the portable navigation terminal at a predetermined position on the display means and auto-scroll setting storage means for storing the auto-scroll display setting for each type of map displayed on the display means when it is switched for another type of map using the manual zoom means based on the map data stored in each layer.

Also, the fourth aspect of the present application relates to the portable navigation terminal of the third aspect, further comprising map data magnifying/reduction processing means for magnifying or reducing a map to a predetermined size based on the map data, wherein the traveling speed that serves as switching criterion is set out in the map data management table for each type of map based on the map data in each layer as well as the traveling speed of maps generated by the map data magnifying/reduction processing means.

Also, the fifth aspect of the present application pertains to a portable navigation terminal that receives map data from an information distribution server while switching the map data contained in several layers in accordance with the traveling speed detected by a speed detecting means and displays maps, wherein the portable navigation terminal comprises: display means; a map data management table in which the traveling speed that serves as switching criterion is set out for each type of map based on the map data in each layer; auto-zoom means for automatically selecting the type of map to be displayed on the display means based on the map management table; auto-scroll means for continually displaying the current position of the portable navigation terminal at a predetermined position on the display means; and auto-scroll setting storage means for storing the auto-scroll display setting for each type of map displayed on the display means when it is switched for another type of map using manual zoom means based on the map data stored in each layer, and where auto-scroll display setting for a map switched by manual zoom means is not stored in the auto scroll setting storage means, the auto-scrolling process in the display means terminates.

Also, the sixth aspect of the present application pertains to the portable navigation terminal of the fifth aspect, which further comprises map data magnifying/reduction processing means for magnifying or reducing a map to a predetermined size based on the map data, wherein the traveling speed that serves as switching criterion is set out in the map data management table for each type of map based on the map data in each layer as well as the traveling speed of maps generated by the map data magnifying/reduction processing means.

Also, the seventh aspect of the present application pertains to a portable navigation terminal that receives map data from an information distribution server while switching the map data contained in several layers in accordance with the traveling speed detected by a speed detecting means and displays maps, wherein the portable navigation terminal comprises: display means; a map data management table in which the traveling speed that serves as switching criterion is set out for each type of map based on the map data in each layer; auto-zoom means for automatically selecting the type of map to be displayed on the display means based on the map management table; auto-scroll means for continually displaying the current position of the portable navigation terminal at a predetermined position on the display means, and operates in conjunction with the auto-zoom means, if activated.

Also, the eighth aspect of the present application pertains to the portable navigation terminal of the seventh aspect, further comprising map data magnifying/reduction processing means for magnifying or reducing a map to a predetermined size based on the map data, wherein the traveling speed that serves as switching criterion is set out in the map data management table for each type of map based on the map data in each layer as well as the traveling speed of maps generated by the map data magnifying/reduction processing means.

Also, the ninth aspect of the present application pertains to a portable navigation terminal that receives map data from an information distribution server while switching the various layers of map data in accordance with the traveling speed detected by the speed detecting means and displays a map, wherein the portable navigation terminal comprises: display means; a map data management table in which the traveling speed that serves as switching criterion is set out for each type of map based on the map data in each layer; auto-zoom means for automatically selecting the type of map to be displayed on the display means based on the map management table; auto-scroll means for continually displaying the current position of the portable navigation terminal at a predetermined position on the display means; and manual scroll means for scrolling a map manually on the display means, whereby the auto-zoom means and the auto-scroll means are simultaneously turned off if the manual scroll means is operated effectively.

Also, the tenth aspect of the present application pertains to the portable navigation terminal of the ninth aspect, further comprising map data magnifying/reduction processing means for magnifying or reducing a map to a predetermined size based on the map data, wherein the traveling speed that serves as switching criterion is set out in the map data management table for each type of map based on the map data in each layer as well as the traveling speed of maps generated by the map data magnifying/reduction processing means.

Also, the eleventh aspect of the present application pertains to a portable navigation terminal that receives map data from an information distribution server while switching the map data contained in several layers in accordance with the traveling speed detected by a speed detecting means and displays maps, wherein the portable navigation terminal comprises: display means; a map data management table in which the traveling speed that serves as switching criterion is set out for each type of map based on the map data in each layer; auto-zoom means for automatically selecting the type of map to be displayed on the display means in accordance with the traveling speed of the portable navigation terminal; and auto-zoom setting storage means for storing the auto-zoom display setting for each type of map that the auto-zoom means can automatically select based on the map data contained in each layer.

Also, the twelfth aspect of the present application pertains to the portable navigation terminal of the eleventh aspect, further comprising map data magnifying/reduction processing means for magnifying or reducing a map to a predetermined size based on the map data, wherein the traveling speed that serves as switching criterion is set out in the map data management table for each type of map based on the map data in each layer as well as the traveling speed of maps generated by the map data magnifying/reduction processing section.

Also, the thirteenth aspect of the present application pertains to a portable navigation terminal that receives map data from an information distribution server while switching the map data contained in several layers in accordance with the traveling speed detected by a speed detecting means and displays a map, wherein the portable navigation terminal comprises: display means; a map data management table in which the traveling speed that serves as switching criterion is set out for each type of map based on the map data in each layer; and auto-zoom means for automatically selecting the type of map to be displayed on the display means in accordance with the traveling speed of the portable navigation terminal, whereby the traveling speed of the portable navigation terminal which serves as switching criterion is set out and stored in the map data management table to acquire a hysteretic characteristic depending on the direction of the switched map;

Also, the fourteenth aspect of the present application pertains to the portable navigation terminal of the thirteenth aspect, further comprising map data magnifying/reduction processing means for magnifying or reducing a map to a predetermined size based on the map data, wherein the traveling speed that serves as switching criterion is set out for each type of map based on the map data in each layer as well as the traveling speed of maps generated by the map data magnifying/reduction processing means.

Also, the fifteenth aspect of the present application pertains to the portable navigation terminal of any one of the first aspect to the fourteenth aspect, further comprising a GPS receiver, wherein the traveling speed is detected based on the average traveling speed of the portable navigation terminal between two points of the GPS system.

Also, the sixteenth aspect of the present application pertains to the portable navigation terminal of any one of the first aspect to the fourteenth aspect, and which is further provided with an acceleration sensor, wherein the portable navigation terminal integrates the output of the acceleration sensor and detects the traveling speed of the portable navigation terminal.

Also, the seventeenth aspect of the present application pertains to a program for a computer comprising a portable navigation terminal which receives map data from an information distribution server while switching the map data in several layers in accordance with the traveling speed of the portable navigation terminal detected by a speed detecting means and displays a map, wherein the portable navigation terminal comprises: a map data management table in which the traveling speed that serves as switching criterion is set out for each type of map based on the map data in each layer; and auto-scroll setting storage means for storing auto-scroll display for each type of map displayed on the display means when it is switched for another type of map using the manual zoom means based on the map data stored in each layer, whereby the program executes the following processes: display a map on the display means by auto-zoom process in response to an activity of the auto-zoom means based on the map management table; and perform auto scrolling based on the setting stored in the auto-scroll setting storage means in response to an activity of the auto-scroll means by which the current position of the portable navigation terminal is continually displayed at a predetermined position on the display means.

Also, the eighteenth aspect of the present application pertains to a program for a computer comprising a portable navigation terminal which receives map data from an information distribution server while switching the map data in several layers in accordance with the traveling speed detected by a speed detecting means and displays a map, wherein the portable navigation terminal comprises: map data magnifying/reduction processing means for magnifying or reducing a map to a predetermined size based on the map data; and auto-scroll setting storage means for storing the auto-scroll display setting for each type of map displayed on the display means when it is switched for another type of map using the manual zoom means based on the map data stored in each layer, and the program executes the following processes: display a map on the display means by auto-zoom process in response to an activity of the auto-zoom means based on the map management table; and perform auto scrolling based on the setting stored in the auto-scroll setting storage means in response to an activity of the auto-scroll means by which the current position of the portable navigation terminal is continually displayed at a predetermined position on the display means.

Also, the nineteenth aspect of the present application pertains to a program for a computer comprising a portable navigation terminal which receives map data from an information distribution server while switching the map data in several layers in accordance with the traveling speed of the portable navigation terminal detected by a speed detecting means and displays a map, wherein the portable navigation terminal comprises: a map data management table in which the traveling speed that serves as switching criterion is set out for each type of map based on the map data in each layer; and auto-scroll setting storage means for storing the auto-scroll display setting for each type of map displayed on the display means when it is switched for another type of map using the manual zoom means based on the map data stored in each layer, whereby the process of auto-scrolling in the display means is inhibited when auto-scroll display setting is not stored in the auto-scroll setting storage means for the resulting map after switching takes place using the manual zoom means.

Also, the twentieth aspect of the present application pertains to a program for a computer comprising a portable navigation terminal which receives map data from an information distribution server while switching the map data in several layers in accordance with the traveling speed of the portable navigation terminal detected by a speed detecting means and displays a map, wherein the portable navigation terminal comprises: map data magnifying/reduction processing means for magnifying or reducing the map to a predetermined size based on the map data; and auto-scroll setting storage means for storing the auto-scroll display setting for each type of map displayed on the display means when it is switched for another type of map using the manual zoom means based on the map data stored in each layer as well as the auto-scroll display setting for maps generated by the map data magnifying/reduction processing section, whereby the process of auto-scrolling in the display means is inhibited when auto-scroll display setting is not stored in the auto-scroll setting storage means for the resulting map after switching takes place using the manual zoom means.

Also, the twenty-first aspect of the present application pertains to a program for a computer comprising a portable navigation terminal which receives map data from an information distribution server while switching the map data in several layers in accordance with the traveling speed of the portable navigation terminal detected by a speed detecting means and displays a map, wherein the portable navigation terminal comprises: a map data management table in which the traveling speed that serves as a switching criterion is set out for each type of map based on the map data in each layer, and the program executes the following processes: display a map on the display means by auto-zoom process in response to an activity of the auto-zoom means based on the map management table; perform auto-scrolling based on the setting stored in the auto-scroll setting storage means in response to an activity of the auto-scroll means by which the current position of the portable navigation terminal is continually displayed at a predetermined position on the display means; and make the auto-scroll means operate in conjunction with the auto-zoom means, if made operative.

Also, the twenty-second aspect of the present application pertains to a program for a computer comprising a portable navigation terminal which receives map data from an information distribution server while switching the map data in several layers in accordance with the traveling speed of the portable navigation terminal detected by a speed detecting means and displays a map, wherein the portable navigation terminal comprises: map data magnifying/reduction processing means for magnifying or reducing the map to a predetermined size based on the map data; and a map data management table in which the traveling speed that serves as switching criterion is set out for each type of map based on the map data in each layer as well as the traveling speed of maps generated by the map data magnifying/reduction processing means, and the program executes the following processes: display a map on the display means by auto-zoom process in response to an activity of the auto-zoom means based on the map management table; and perform auto scrolling based on the setting stored in the auto-scroll setting storage means in response to an activity of the auto-scroll means by which the current position of the portable navigation terminal is continually displayed at a predetermined position on the display means, and make the auto-scroll means operate in conjunction with the auto-zoom means, if made operative.

Also, the twenty-third aspect of the present application pertains to a program for a computer comprising a portable navigation terminal which receives map data from an information distribution server while switching the map data in several layers in accordance with the traveling speed of the portable navigation terminal detected by a speed detecting means and displays a map, wherein the portable navigation terminal comprises: a map data management table in which the traveling speed that serves as switching criterion is set out for each type of map based on the map data in each layer as well as the traveling speed of maps generated by the map data magnifying/reduction processing means; auto-zoom means for automatically selecting the type of map to be displayed on the display means based on the map management table; auto-scroll means for continually displaying the current position of the portable navigation terminal at a predetermined position on the display means; and manual scroll means for scrolling a map manually on the display means, whereby the auto-zoom means and the auto-scroll means are simultaneously turned off if the manual scroll means is operated effectively.

Also, the twenty-fourth aspect of the present application pertains to a program for a computer comprising a portable navigation terminal which receives map data from an information distribution server while switching the map data in several layers in accordance with the traveling speed of the portable navigation terminal detected by a speed detecting means and displays a map, wherein the portable navigation terminal comprises: map data magnifying/reduction processing means for magnifying or reducing the map to a predetermined size based on the map data; a map data management table in which the traveling speed that serves as switching criterion is set out for each type of map based on the map data in each layer as well as the traveling speed of maps generated by the map data magnifying/reduction processing means; auto-zoom means for automatically selecting the type of map to be displayed on the display means based on the map management table; auto-scroll means for continually displaying the current position of the portable navigation terminal at a predetermined position on the display means; and manual scroll means for scrolling a map manually on the display means, whereby the auto-zoom means and the auto-scroll means are simultaneously turned off if the manual scroll means is operated effectively.

Also, the twenty-fifth aspect of the present application pertains to a program for a computer comprising a portable navigation terminal which receives map data from an information distribution server while switching the map data in several layers in accordance with the traveling speed of the portable navigation terminal detected by a speed detecting means and displays a map, wherein the portable navigation terminal comprises: a map data management table in which the traveling speed that serves as switching criterion is set out for each type of map based on the map data in each layer; and auto-zoom setting storage means for storing the auto-zoom display setting for each type of map that the auto-zoom means can automatically select based on the map data contained in each layer; and the program displays a map on the display means by auto-zoom process in response to an activity of the auto-zoom means based on the map management table.

Also, the twenty-sixth aspect of the present application pertains to a program for a computer comprising a portable navigation terminal which receives map data from an information distribution server while switching the map data in several layers in accordance with the traveling speed of the portable navigation terminal detected by a speed detecting means and displays a map, wherein the portable navigation terminal comprises: map data magnifying/reduction processing means for magnifying or reducing the map to a predetermined size based on the map data; a map data management table in which the traveling speed that serves as switching criterion is set out for each type of map based on the map data in each layer as well as the traveling speed of maps generated by the map data magnifying/reduction processing section; and auto-zoom setting storage means for storing the auto-zoom display setting for each type of map that the auto-zoom means can automatically select based on the map data contained in each layer; and the program displays a map on the display means by auto-zoom process in response to an activity of the auto-zoom means based on the map management table.

Advantages of the Invention

In the portable navigation terminal of the first aspect, while the appropriate map (any one of wide-range map, mid-range map, detailed map, urban area map) is displayed upon automatic switching in accordance with the traveling speed of the terminal, it is possible to conduct map stopping or map fixing at a certain point during travel to inhibit map switching and maintain the display of the map currently displayed at the time of map stopping. This makes it possible to view a detailed map including a specific point during high-speed travel.

Also, in the second aspect, it is possible to provide a program that causes a computer comprising a portable navigation terminal to execute map stopping at a certain point during travel to inhibit map switching and maintain the display of the map currently displayed at the time. It is thus possible to provide a portable navigation terminal that makes it possible to view a detailed map including a specific point during high-speed travel.

Also, in the third aspect, in a portable navigation terminal that displays the appropriate map (any one of wide-range map, mid-range map, detailed map, urban area map) in accordance with the traveling speed by automatic switching, it is possible to execute map stopping at a certain point during travel by disabling the auto-zoom means and the auto-scroll means, thereby inhibit map switching, and maintain the display of the map currently displayed at the time. This makes it possible to view a detailed map including a specific point during high-speed travel.

Also, in the fifth aspect, auto-scroll display setting is stored in the auto-scroll setting storage means for each type of map such that when map stopping is executed using the manual scroll means, the map on display is magnified each time the manual scroll means is operated. It is thus possible to execute map stopping in respect of a map for which auto scroll has been set to be inoperative. It is also possible to draw a map based on a position specified by the manual scroll means without placing the current position at the center of the drawing.

Also, in the seventh aspect, auto-zoom means is provided for automatically selecting the type of map to be displayed on the display means based on the map data management table as well as auto-scroll means for continually displaying the current position of the portable navigation terminal at a predetermined position on the display means, and operates in conjunction with the auto-zoom means, if activated. Therefore, when the map is switched, the current position is displayed at the center of the display means, which facilitates visual recognition.

Also, in the ninth aspect, auto-zoom means for automatically selecting the type of map to be displayed on the display means based on the map data management table, the auto-scroll means continually displays the current position of the portable navigation terminal at a predetermined position on the display means, and the manual scroll means manually scrolls the map on the display means, and if the manual scroll means is operated effectively, the auto-zoom means as well as the auto-scroll means are simultaneously turned off. Therefore, after map stopping is executed, map magnification and a drawing range is determined by the manual scroll means, therefore making it possible to display a map including any point on the map at random at a predetermined position on the display screen, which facilitates visual recognition of the place or point of interest.

Also, in the eleventh aspect, auto-zoom setting storage means is provided for storing auto-zoom display setting for each of type of map that the auto-zoom means can automatically select based on the map data contained in each layer. Therefore, a user can arbitrarily subject a particular map to auto zoom, which makes it possible to conduct map switching since only maps that would highly likely be used are subjected to auto-zoom processing.

Also, in the thirteenth aspect, the traveling speed that serves as switching criterion and is stored in the map data management table is set so as to have a hysteretic characteristic in accordance with the direction of the switched map. Therefore, even if the traveling speed fluctuates between speed ranges, map switching does not occur each time and map display can be performed so as to offer easier visual recognition.

According to the fourth, sixth, eighth, tenth, twelfth and fourteenth aspects, each pertaining to the portable navigation terminals referred to in the third, fifth, seventh, ninth, eleventh and thirteenth aspects, respectively, map data magnifying/reduction means is provided for, and map data distributed from the information distribution server which are magnified or reduced at predetermined ratios are generated.

As a result, the distribution of map data from the information distribution server to the portable navigation terminal is required only when map display is performed involving switching of map data to a different layer. This reduces the communication load of the information distribution server.

Also, in the fifteenth aspect, the use of the GPS receiver makes it possible to calculate the traveling speed of the portable navigation terminal based on the average traveling speed thereof between two points of the GPS system.

Also, in the sixteenth aspect, the portable navigation terminal is provided with an acceleration sensor, and this makes it possible to detect the traveling speed of the portable navigation terminal by integrating the output of the acceleration sensor.

Also, in the seventeenth aspect to the twenty-sixth aspect, it is possible to provide programs that realize the portable navigation terminals according to the third aspect to the twelfth aspect by using a computer.

BRIEF DESCRIPTION OF THE DRAWINGS

FIG. 2 is a diagram illustrating the structure of a map data management table that stores correspondence between map types and traveling speed ranges.

DESCRIPTION OF THE PREFERRED EMBODIMENTS

Figure 1:
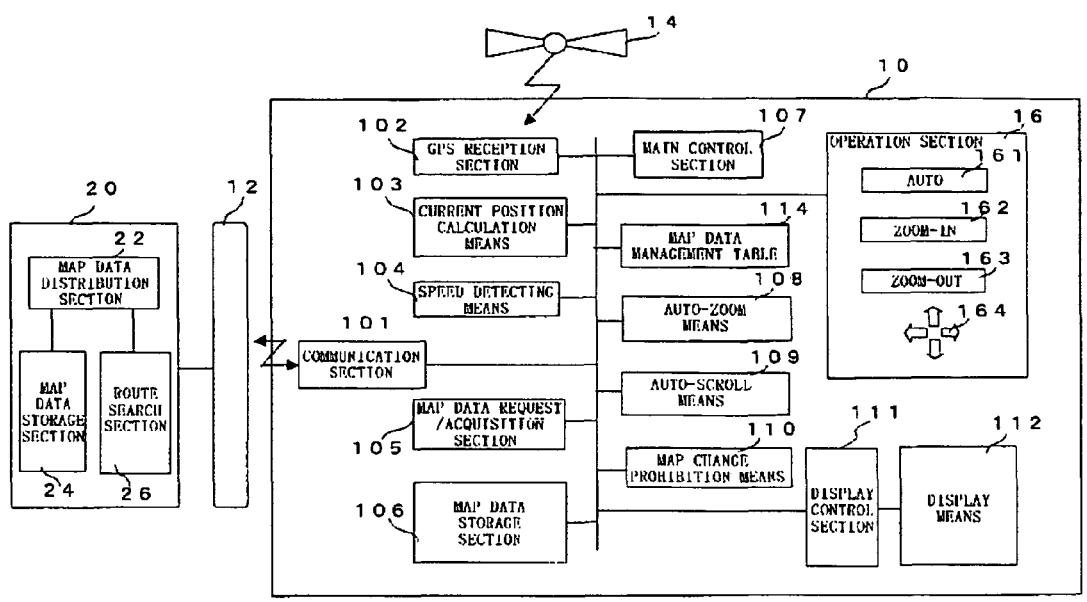
FIG. 1 is a block diagram illustrating the structure of a portable navigation terminal according to the first embodiment of the present invention.

Hereinafter, specific examples of the present invention will be described in detail with reference to embodiments thereof and the drawings. FIG. 1 is a block diagram illustrating the structure of a portable navigation terminal according to the first embodiment of the present invention.

First Embodiment

A portable navigation terminal 10 according to the first embodiment of the present invention includes a GPS reception section 102 for receiving a GPS signal from a GPS satellite 14 and a communication section 101 for communicating with an information distribution server 20 via the Internet 12. Further, the portable navigation terminal 10 is specifically constituted by a mobile phone, and the communication section 101 is configured to perform not only packet communication via the Internet 12 but also wireless communication with a mobile phone base station.

The portable navigation terminal 10 includes a main control section 107 that is constituted by a microcomputer or the like and controls the operation of each component thereof, and uses the GPS reception section 102 to receive a GPS satellite signal and, based on this, calculates the current position at a current position calculation means 103. Information on the current position of the portable navigation terminal calculated at the current position calculation means 103 is supplied to the information distribution server 20 via the communication section 101. The portable navigation terminal 10 also includes an operation means 16 and is configured to transmit to the information distribution server 20 a request for route guidance (i.e., navigation) with information pertaining to a starting point and a destination inputted by operating the operation means 16.

The information distribution server 20 includes a map data distribution section 22, a map data storage section 24, and a route search section 26 and searches for a route from the starting point to the destination at the route search section 26 based on the information pertaining to the starting point, the destination and the current position transmitted from the portable navigation terminal 10, reads map data containing the current position from the map data storage section 24, embeds route guidance data found by the route search section 26 into the map data, and uses the map data distribution section 20 to distribute the combined data to the portable navigation terminal 10.

The portable navigation terminal 10 receives the combined data (consisting of map data and route guidance data) distributed from the information distribution server 20 via the communication section 101 and a map data request/acquisition section 105, and stores it in a map data storage section 106. A display control section 111 reads the map data stored in the map data storage section 106, and performs map display control on a display means 112.

The portable navigation terminal 10 includes speed detecting means 104 which detects the traveling speed of the portable navigation terminal 10. The traveling speed of the portable navigation terminal 10 can be detected, for example, by obtaining the average traveling speed of the portable navigation terminal 10 between two points acquired from a GPS system, or alternatively, by providing the portable navigation terminal 10 with an acceleration sensor and integrating the output of the acceleration sensor.

The traveling speed detected by the speed detecting means 104 is supplied to the map data request/acquisition section 105, and the map data request/acquisition section 105 issues a request for acquiring map data corresponding to the traveling speed to the information distribution server 20. Establishing correspondence between varying traveling speeds and the maps to be obtained in accordance with the relevant request issued to the information distribution server 20 can be easily performed, for example, by using a map data management table in which the ranges of speed and map data types (wide-range map, mid-range map, detailed map, urban area map) are tabled, as illustrated in FIG. 2.

FIG. 2 is a diagram illustrating the structure of the map data management table that stores correspondence between map types comprising four layers of map data, i.e., wide-range map, mid-range map, detailed map, urban area map and the varying ranges of traveling speed of the portable navigation terminal 10. In the case of the map data management table illustrated in FIG. 2, the association therebetween is such that: if the traveling speed of the portable navigation terminal 10 is 100 km/h or greater, the Wide-range Map 1 is selected; if it is between 60 km/h and 100 km/h both inclusive, the Mid-range Map 1 is selected; if it is between 20 km/h and 60 km/h both inclusive, the Detailed Map 1 is selected; while if it is 20 km/h or less, the Urban Area Map 1 is selected. Therefore, based on the traveling speed, the map data request/acquisition section 105 may refer to the map data management table to determine the corresponding map data type and transmit the information on such map data type to the information distribution server.

The operation section 16 is provided with an auto button 161, a zoom-in button 162, a zoom-out button 163, and manual scroll means 164 (consisting of Up/Down/Left/Right arrow keys).

The auto button 161 makes the auto-zoom means 108 operative for zooming (magnifying or reducing) the map displayed on the display means 112 while the auto-scroll means 109 automatically scrolls the map such that the current position is maintained at the center of the display screen.

The zoom-in button 162 and the zoom-out button 163 are used to make ineffective an instruction based on an operation of the auto button 161 and, regardless of the traveling speed of the portable navigation terminal, maintain the display of the map being displayed on the display means and manually (by hand) perform zoom-in (magnifying) and zoom-out (reducing) operations.

The manual scroll means 164 (comprising the Up/Down/Left/Right arrow keys) is used to switch the scroll mode to manual scroll.

These buttons and keys are used to operate the map displayed on the display means 112, and if the auto button 161 is operated, for example, the auto-zoom means 108 and the auto-scroll means 109 are made operative and a map corresponding to the traveling speed of the portable navigation terminal is selected and displayed on the display means 112 and, in addition, the map being displayed is automatically scrolled such that the current position of the portable navigation terminal is positioned at the center of the screen of the display means 112.

The zoom-in button 162 and the zoom-out button 163 are manual operation buttons for zooming in or zooming out on the map being displayed on the display means 112. The Up/Down/Left/Right keys denoted by the reference numeral "164" have a manual scrolling function, and if these keys are operated, the map being displayed on the display means 112 is scrolled in the direction corresponding to the key operated.

The Up/Down/Left/Right keys (the manual scroll means 164), the zoom-in button 162, the zoom-out button 163, etc., also function as map stopping buttons, and if any one of these keys is operated regardless of the traveling speed of the portable navigation terminal, switching to another type of map corresponding to the speed is inhibited by the map change prohibition means 110.

If the zoom-in button 162 or the zoom-out button 163 is operated, the auto-zoom means 108 and the auto-scroll means 109 are made inoperative and the map change prohibition means 110 is activated so that the map being displayed on the display means 112 when the map stopping operation is performed or the magnified or reduced version of such map within the range of the mesh thereof continues to be displayed regardless of the current position of the portable navigation terminal 10.

In addition, switching to new map data including the current position is controlled even if the current position of the portable navigation terminal 10 changes and automatic or manual scrolling control is achieved by preventing the creation of requests for distribution of new map data.

Suppose that the user of the portable navigation terminal 10 who is on board a high-speed transportation facility such as the SHINKANSEN or the like operates the auto button 161 to receive the distribution of map data pertinent to his current position and route data from the information distribution server 20, and that a map is being displayed on the display means 112. On such occasion, the user may take notice of a particular building or structure that catches his interest from the train window and then wish to zoom in on the map data of such object of interest and closely view the map.

In this case, if the user operates any one of the map stopping buttons such as the zoom-in button 162, the zoom-out button 163, the manual scroll button 164, and the like, the map change prohibition means 110 will be activated to inhibit switching of the map being displayed on the display means 112. Therefore, the user is able to maintain or keep the map data pertaining to such position that has been passed, fixed on the display means 112, and continue to view it while moving away from it.

The map data stored in the map data storage section 24 of the information distribution server 20 is generated in vector format. In general, map data is generated in bitmap format or in vector format. When simply zooming in or zooming out on map data of the same content, in the case of map data generated in bitmap format, the bitmap data must be generated in advance by magnifying or reducing the map with a desired magnifying or reduction ratio. Therefore, along with the map data contained in each layer, the corresponding magnified or reduced map data must be generated in advance. In contrast, in the case of map data generated in vector format, zoom processing can be easily achieved by computing the desired size of the length of each of the component vectors that constitute the map with a reduction or magnification ratio. Thus, map data obtained by magnification or reduction with different magnifying or reduction ratios can be acquired based on map data in a certain layer.

Therefore, as illustrated in the map data management table of FIG. 2, it may be so arranged that map data with different amounts of information, specifically, four layers (A to D) of map data of different types, e.g. Wide-range Map 1, Mid-range Map 1, Detailed Map 1, and Urban Area Map 1, are stored in the information distribution server 2, and when the need for map data pertaining to a different layer arises, that map data is distributed from the information distribution server 20 to the portable navigation terminal 10. Then, by performing magnifying or reducing computation on the distributed map data with a predetermined ratio, map data subjected to magnification or reduction can be easily generated on the side of the portable navigation terminal 10.

That is, map data subjected to magnification or reduction with a predetermined ratio can be easily generated from map data in a certain layer. For example, it is possible to generate map data for Wide-range Map 2 and Wide-range Map 3, which are obtained by magnification with predetermined ratios from the map data of Wide-range Map 1 in Layer A. The same is true for map data in the other layers. Thus, the load of map data transmission between the information distribution server 20 and the portable navigation terminal 10 can be reduced. A specific example thereof will be described in detail in the Second Embodiment below.

Second Embodiment

Figure 3:
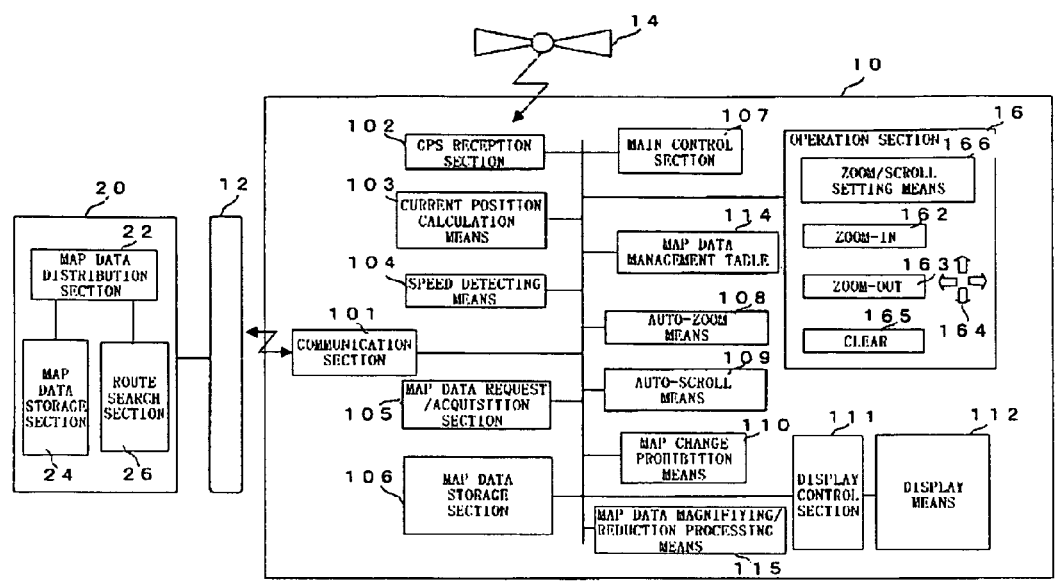
FIG. 3 is a block diagram illustrating the structure of a portable navigation terminal according to the second embodiment of the present invention.
Figure 4:
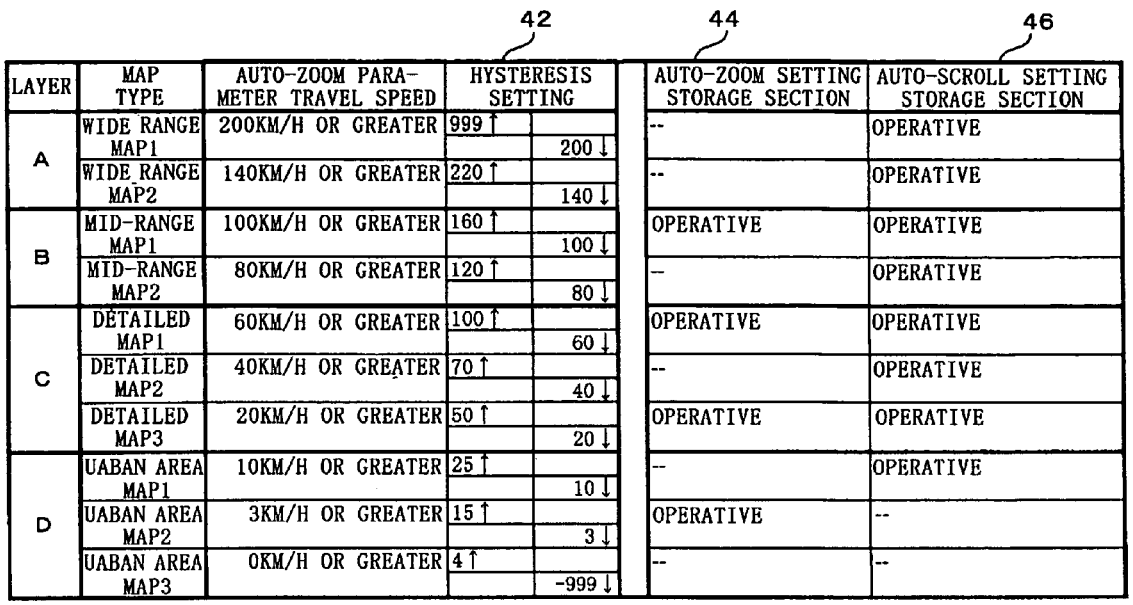
FIG. 4 is a diagram illustrating the structure of a map data management table according to the second embodiment as well as the structures of the auto-zoom means and the auto-scroll setting storage means.

FIG. 3 is a block diagram illustrating the structure of a portable navigation terminal according to the second embodiment of the present invention. FIG. 4 is a diagram illustrating the structure of a map data management table according to the second embodiment as well as structures of the auto-zoom and auto-scroll setting storage means. In FIG. 3, the same components appearing in FIG. 1 are denoted by the same reference numerals indicated in FIG. 1.

As illustrated in FIG. 3, the portable navigation terminal 10 and information distribution server 20 according to the second embodiment basically have the same structures as those of the first embodiment illustrated in FIG. 1. The portable navigation terminal 10 shown in FIG. 3 has each of the communication section 101, the GPS reception section 102, current position calculation means 103, speed detecting means 104, the map data request/acquisition section 105, the map data storage section 106, auto-zoom means 108, auto-scroll means 109, the map change prohibition means 110, the display control section 111, and display means 112 of the portable navigation terminal 10 shown in FIG. 1 and whose functions correspond to those shown in FIG. 1. Also, the information distribution server 20 of FIG. 3 has each of the map data distribution section 22, the map data storage section 24, and the route search section 26 of those of FIG. 1 and whose functions correspond to those shown in FIG. 1.

The portable navigation terminal 10 and the information distribution server 20 illustrated in FIG. 3 are different from those of FIG. 1 in the following respects: (1) the portable navigation terminal 10 of FIG. 3 is provided with map data magnifying/reduction processing means 115; (2) the number of map types is greater in the structure of the map data management table 114 illustrated in FIG. 4; (3) association between map types and traveling speeds involves hysteresis; and (4) the portable navigation terminal 10 of FIG. 3 is provided with an auto-zoom setting storage section 44 for storing the auto-zoom display settings for each type of map and an auto-scroll setting storage section 46 for storing the auto-scroll display settings for each type of map. In addition, the operating buttons and operating keys of an operation section 16 are partly different.

FIG. 4 illustrates the structure of a map data management table similar to that of FIG. 2. The map data stored in the map data storage section 24 of the information distribution server 20 is map data generated in vector format, and four layers (A to D) of map data having mutually different information, i.e., wide-range map, mid-range map, detailed map, urban area map, are stored therein.

For example, only four pieces of map data, i.e., Wide-range Map 1, Mid-range Map 1, Detailed Map 1, and Urban Area Map 1, are stored in the map data storage section 24. The others, i.e., Wide-range Map 2 to Urban Area Map 2, Detailed Map 3, and Urban Area Map 3, are generated by the map data magnifying/reduction processing means 115 (see FIG. 3) of the portable navigation terminal 10 by performing magnifying or reducing processing on the map data (vector data) of Wide-range Map 1 to Urban Area Map 1 with predetermined magnifying or reducing ratios. Therefore, the need for transmission of map data between the information distribution server 20 and the portable navigation terminal 10 arises only when a map belonging to a different layer is required, and thus the communication load can be reduced.

With respect to each of the map types ranging from Wide-range Map 1 to Urban Area Map 3, the correspondence of the map type with the traveling speed of the portable navigation terminal 10 is set in an auto-zoom parameter traveling speed column. For example, "200 km/h or greater" is set for Wide-range Map 1. In the case where maps are switched in accordance with the traveling speed based on these settings, if the traveling speed repeatedly increases and decreases around a threshold value of switching, switching of displayed maps will happen frequently, resulting in viewing difficulties for the user and increases in communication load.

For example, when the traveling speed is 100 km/h, Mid-range Map 1 is displayed, but if it goes up to 101 km/h, switching is carried out to display Wide-range Map 2. At this time, the map data of Wide-range Map 1 is distributed from the information distribution server to the portable navigation terminal 10, and from this map data, the map data of Wide-range Map 2 is generated.

On the other hand, if the speed decreases to 99 km/h, switching is carried out to display Mid-range Map 1, and at this time, the map data of Mid-range Map 1 is distributed from the information distribution server to the portable navigation terminal 10. Therefore, if the traveling speed frequently changes within the range of 100 km/h, switching of maps will occur each time, necessitating communication of map data.

As such, in the map data management table of FIG. 4, as particularly illustrated in the hysteresis setting column 42, different threshold values are set for each map, i.e., a threshold value for switching when the traveling speed increases and another threshold value for switching when it decreases. Referring to Detailed Map 1 and Mid-range Map 2, for example, settings thereof are as follows. In the case where the traveling speed increases, switching from Detailed Map 1 to Mid-range Map 2 occurs when the traveling speed exceeds 100 km/h. Further, when the traveling speed exceeds 120 km/h, switching from Mid-range Map 2 to Mid-range Map 1 is carried out. In the case where the traveling speed decreases, switching from Mid-range Map 2 to Detailed Map 1 occurs when the speed falls below 80 km/h, and when the speed becomes less than 60 km/h, switching from Detailed Map 1 to Detailed Map 2 is carried out.

Also, the map data management table 114 is provided with the auto-zoom setting storage section (auto-zoom setting storage means) 44 for storing auto-zoom processing settings for each type of map in the auto-zoom means 108 and the auto-scroll setting storage section (auto-scroll setting storage means) 46 for storing auto-scroll processing settings for each type of map in the auto-scroll means 109. The settings can be done by the user himself using the zoom/scroll setting means 166 of the operation section 16. Therefore, the user is able to set at random which maps are to be subjected to zoom processing or scroll processing in auto-zoom or auto-scroll.

For example, in the auto-zoom setting storage section 44 of FIG. 4, settings are established such that the Mid-range Map 1, Detailed Map 1, Detailed Map 3, and Urban Area Map 2 would be subjected to auto-zoom processing, and auto-zoom processing is performed on those map data. Similarly, in the auto-scroll setting storage section 46, settings are established such that Wide-range Map 1 to Urban Area Map 1 would be subjected to auto-scroll processing, and auto-scroll processing is performed on those maps. These auto-scroll settings are also employed when stopping or firmly fixing a map when the portable navigation terminal 10 is in motion. Details of this operation will be described later.

The operation section 16 is provided with a zoom-in button 162 and a zoom-out button 163, which are manual zoom means for zooming in (magnifying) or zooming out (reducing) manually on a map being displayed on the display means 112. If the zoom-in button 162 or the zoom-out button 163 is operated, the auto-zoom means 108 is disabled and, regardless of the traveling speed, the map being displayed on the display means 112 is firmly fixed. Thereafter, by operating the zoom-in button 162 or the zoom-out button 163, it is possible to zoom in or zoom out manually on the map.

The operation section 16 is also provided with a manual scroll means 164 (Up/Down/Left/Right arrow keys) that has, like the zoom-in button 162 and the zoom-out button 163, the function of stopping or firmly fixing the map being displayed on the display means 112 regardless of the traveling speed, as well as the function of switching to manual scrolling.

In addition, the operation section 16 is provided with a clear button 165 to return to auto-scrolling. The zoom/scroll setting means 166 is an operation section for establishing settings as to whether each type of map would be subjected to auto-zoom display and auto-scroll display, If the zoom-in button 162 or the zoom-out button 163 (the manual zoom means) is operated, the auto-zoom means 108 is disabled, and each time the button is operated, the map displayed on the display means 112 is switched to a reduced or magnified version of such map by one level. If the zoom-in button 162 or the zoom-out button 163 is operated when there is no other magnified or reduced map available, the auto-zoom means 108 returns to operative state.

If the manual scroll means 164 is operated in a situation where neither the zoom-in button 162 nor the zoom-out button 163 has been operated, both of the auto-scroll means 109 and the auto-zoom means 108 are effectively disabled while the map change prohibition means 110 is made operative, and the map displayed on the display means 112 at the time when the manual scroll means 164 has been operated is firmly fixed.

Thereafter, although scrolling is possible by operating the manual scroll means 164, scroll processing that requires new map data is inhibited by the map change prohibition means 110.

Suppose, for example, that during high-speed travel on a SHINKANSEN, a map (Wide-range Map 1) is displayed on the display means 112 in accordance with the traveling speed and the display is automatically switched by the auto-zoom means to Wide-range Map 1 including places that have been reached as a result of traveling. In this situation, if a certain building or the like at some point catches the user's interest and prompts him to stop the map on display and zoom in on it to view a Detailed Map or an Urban Area Map, the following operations will be carried out. First, the zoom-in button 162, the zoom-out button 163, or the manual scroll means 164 is operated to firmly fix the current map display for the time being, at Wide-range Map 1, and then, the zoom-in button 162 is operated to switch the display to Mid-range Map, Detailed Map, and Urban Area Map in sequential order.

If the user wishes to return to the original state, he can operate the clear button 165 which would disable the manual scroll means 164, while making the auto-scroll means 109 operative again.

Figure 5:
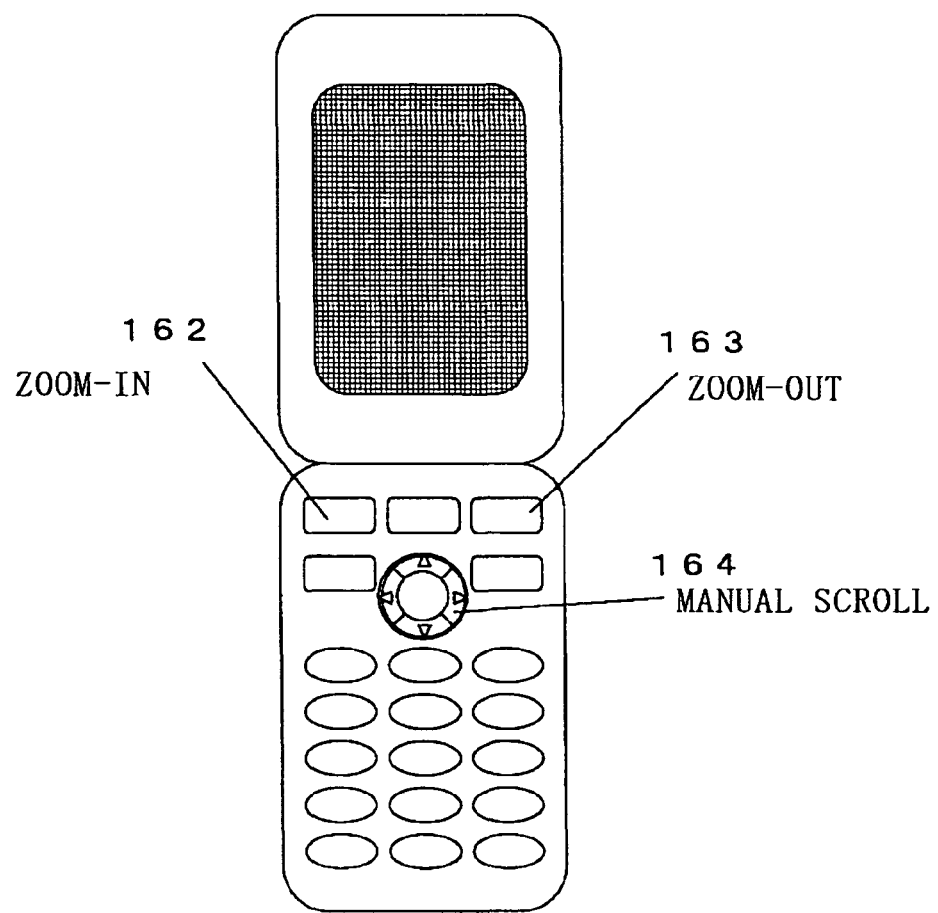
FIG. 5 is a diagram illustrating the outward appearance of the operation means of a portable navigation terminal 10.

FIG. 5 is a diagram illustrating the appearance of the operation section 16 of the portable navigation terminal 10 (the mobile phone). In FIG. 5, the zoom-in button 162 (of the manual zoom means) for carrying out zoom-in operations manually and the zoom-out button 163 (of the manual zoom means) are provided on the upper left or right corner of a collection of buttons, and the manual scroll button 164 (the Up/Down/Left/Right keys) is provided in the upper center thereof.

As mentioned above, each of the zoom-in button 162, the zoom-out button 163, and the manual scroll button 164 function as a map stopping button for stopping a map or keeping it firmly fixed.

Figure 6:
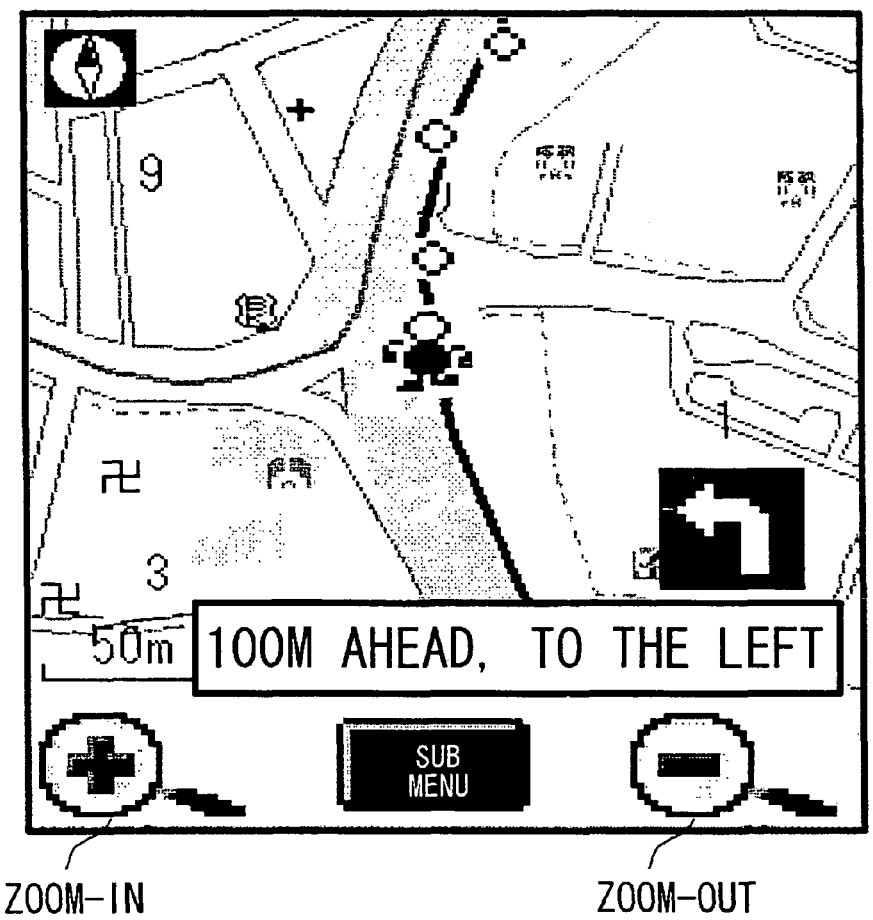
FIG. 6 is a diagram illustrating the outward appearance of the operation means of the portable navigation terminal 10.

FIG. 6 is an illustration of an exemplary map displayed on the display screen of the portable navigation terminal 10. As shown in the illustration, an urban area or town map and route guidance (navigation) are displayed on the display screen, and the zoom-in button and the zoom-out button being set below on the left or right is also shown. The basic structure of this operation section and the structure of this display screen can be similarly applied to the first embodiment of FIGS. 1 and 2. Variations and modifications are possible as may be required.

Figure 7:
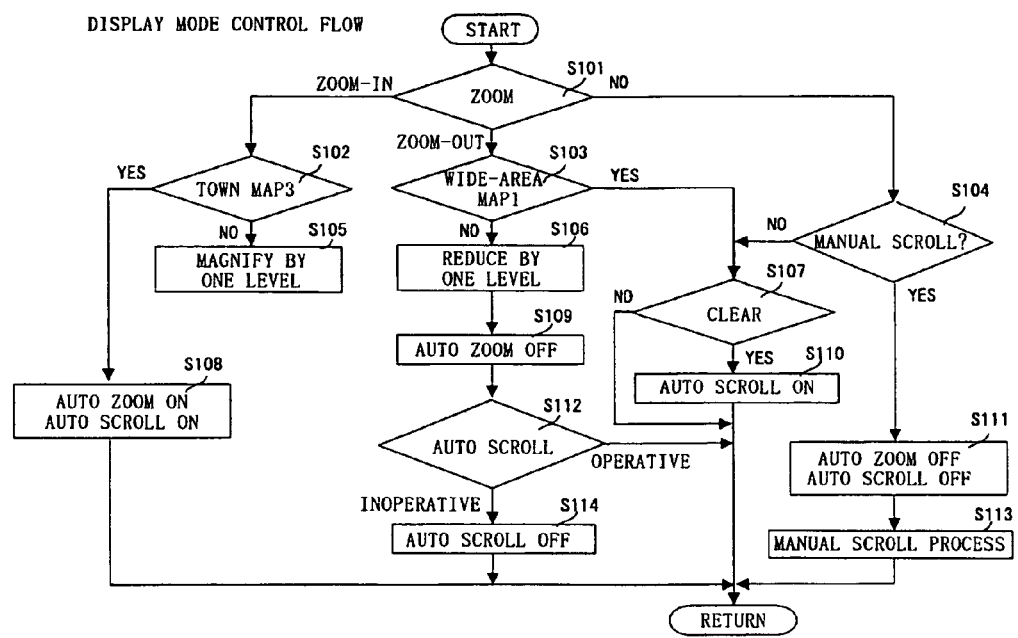
FIG. 7 is a flowchart illustrating the procedure for display mode control.

Next, the control procedure for map display in the portable navigation terminal 10 according to the second embodiment described with reference to FIGS. 3 and 4 will be described in detail. FIG. 7 is a flowchart illustrating the procedure for display mode control in the portable navigation terminal 10.

In the display mode control, it is first determined in step S101 whether the zoom-in button 162 or the zoom-out button 163 has been operated to activate the manual zoom control mode. If the zoom-in button 162 has been operated, a determination is made whether the map being displayed on the display means 112 is Urban Area Map 3 in step S102.

If the map being displayed on the display means 112 is not Urban Area Map 3, the map on display is magnified by one level in step S105. If the map being displayed is Detailed Map 3, for example, it is magnified to Urban Area Map 1. In this case, because map data in different layers are involved, distribution of relevant map data is received from the information distribution server 20.

In step S102, if it is determined that the map being displayed is Urban Area Map 3, since there is no other magnified map available, the manual zoom operation terminates, and the auto-zoom means 108 and the auto-scroll means 109 are made operative (ON mode) in step S108, to shift back to the auto-zoom and auto-scroll display modes.

In step S101, if it is determined that the zoom-out button 163 has been operated, a determination is made in step S10 as to whether the map being displayed on the display means 112 is Wide-range Map 1. If the map being displayed on the display means 112 is not Wide-range Map 1, the map on display is reduced by one level in step S106. If the map being displayed is Detailed Map 1, for example, it is reduced to Mid-range Map 2.

In this case, because map data in different layers are involved, distribution of relevant map data is received from the information distribution server 20. Then, in step S109, the auto-zoom means 108 is made inoperative (OFF mode), and in step S112, the setting of the auto-scroll setting storage section 46 is checked.

Since the auto-scroll setting is "Operative" (see FIG. 4) in the case of Mid-range Map 2, the process terminates and the portable navigation terminal returns to its original state. In the case where the setting is not "Operative", the auto-scroll means 109 is made inoperative (OFF mode) in step S114, and the process ends and the portable navigation terminal returns to its original state.

Meanwhile, if the map being displayed is determined to be Wide-range Map 1 in step S103, since there is no other reduced map available, a determination is made in step S107 whether the clear button 165 has been operated. If not, the process terminates and the portable navigation terminal returns to its original state. If it is determined that the clear button 165 has been operated, the auto-scroll means 109 is made operative (ON mode) in step S110, and the process terminates and the portable navigation terminal returns to its original state.

In step S101, if it is determined that neither the zoom-in button 162 nor the zoom-out button 163 has been operated, but the manual scroll button 164 is operated in step S104, while the auto-zoom means 108 and the auto-scroll means 109 are made inoperative (OFF mode) in step S111, the map change prohibition means 110 is activated to fixedly display the map, and manual scrolling processing becomes possible in step S113.

The meaning of the "Operative" and "Inoperative" settings in the auto-scroll setting storage section 46 of FIG. 4 will now be described. These settings refer to the situation where the auto-scroll means 109 is caused to stop operating when only the zoom-in button 162 is operated without establishing contact with the manual scroll means 164 (the Up/Down/Left/Right keys) at all. That is, the auto-scroll means 109 is made inoperative (OFF mode) when the map has been magnified to the size of a map for which "Inoperative" is set at the auto-scroll setting storage section 46 (step S114).

As described above, the portable navigation terminal 10 according to the present invention is constituted in such manner that it is possible to first press the manual scroll means 164 (the Up/Down/Left/Right keys) mildly to firmly fix the map and thereafter use the zoom-in button 162 to zoom in on the map. Meanwhile, for a person who is not familiar with such operation, it is possible to make the auto-scroll means 109 inoperative and to firmly fix the map merely by operating the zoom-in button 162.

Figure 8:
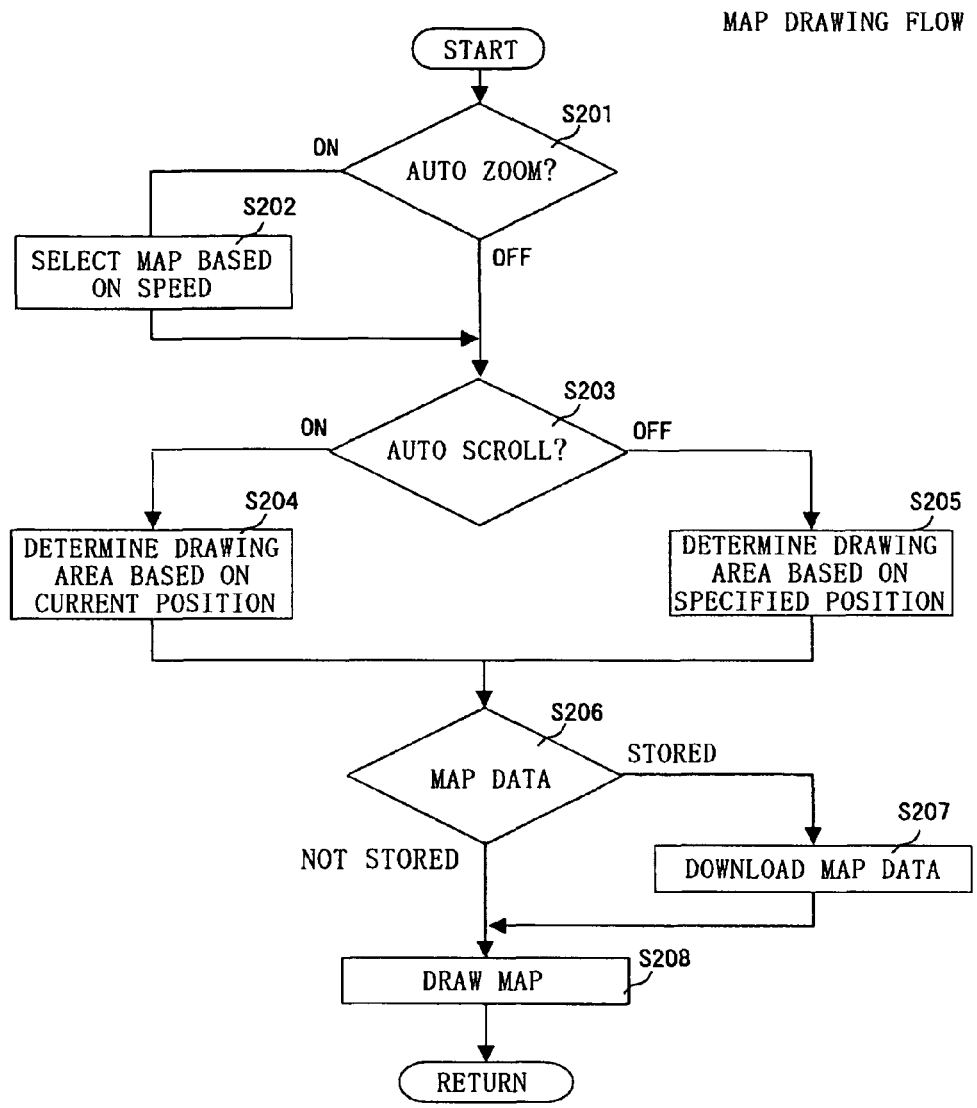
FIG. 8 is a flowchart illustrating the procedure for drawing a map.

Next, the process involved for map drawing in the portable navigation terminal 10 according to the second embodiment of the present invention will be described, vis-à-vis FIG. 8, which is a flowchart illustrating the map drawing procedure in the portable navigation terminal 10 of FIGS. 3 and 4. First, it is determined in step S201 whether the auto-zoom means 108 is operative or not (ON or OFF mode), i.e., whether auto-zoom processing is being performed or not.

If the auto-zoom means 108 is operative (ON mode), a map corresponding to the traveling speed of the portable navigation terminal 10 is selected in step S202, and control proceeds to step S203. The correspondence between the traveling speed and the map data has been described with reference to the map data management table of FIG. 4, and the details of selecting the map corresponding to the traveling speed will be described in detail later with reference to the flowchart shown in FIG. 9. If the auto-zoom means 108 is inoperative (OFF mode), control proceeds to step S203.

Next, in step S203, it is determined whether the auto-scroll means 109 is operative or not (ON or OFF mode), i.e., whether auto-scroll processing is being performed or not. If the auto-scroll means 109 is operative (ON mode), the area of the map to be drawn on the display means 112 is determined in step S204 based on information pertaining to the current position of the portable navigation terminal 10, such that the current position is positioned at the center of the display screen, and control proceeds to step S206.

If the auto-scroll means 109 is inoperative (OFF mode), the area of the map to be drawn on the display means 112 is determined in step S205 based on the position specified by operating the manual scroll button 164 of the operation section 16 of the portable navigation terminal 10 (i.e., any point arbitrarily selected by scrolling using the manual scroll button 164), and control proceeds to step S206.

In step S206, it is determined whether the map data determined in step S202 is stored in the map data storage section 106 of the portable navigation terminal 10. If there is no relevant map data in the map data storage section 106, the portable navigation terminal 10 requests and acquires from the information distribution server 20 the relevant map data in step S207. If relevant map data is available in the map data storage section 106, the map is displayed or drawn on the display means 122 in step S208 according to the area of the map determined in step S204 or step S205, and control returns to the original state of the portable navigation terminal (i.e., one instance of processing is completed).

Figure 9:
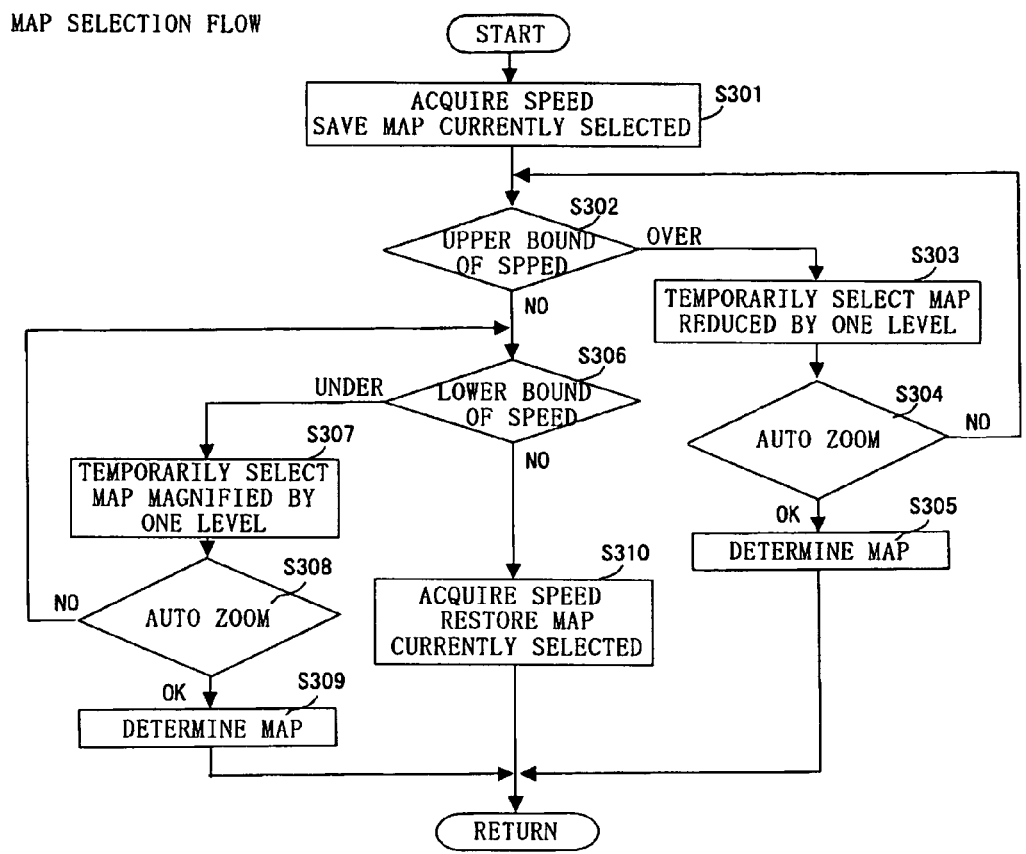
FIG. 9 is a flowchart illustrating the procedure for selecting a map.
Figure 10:
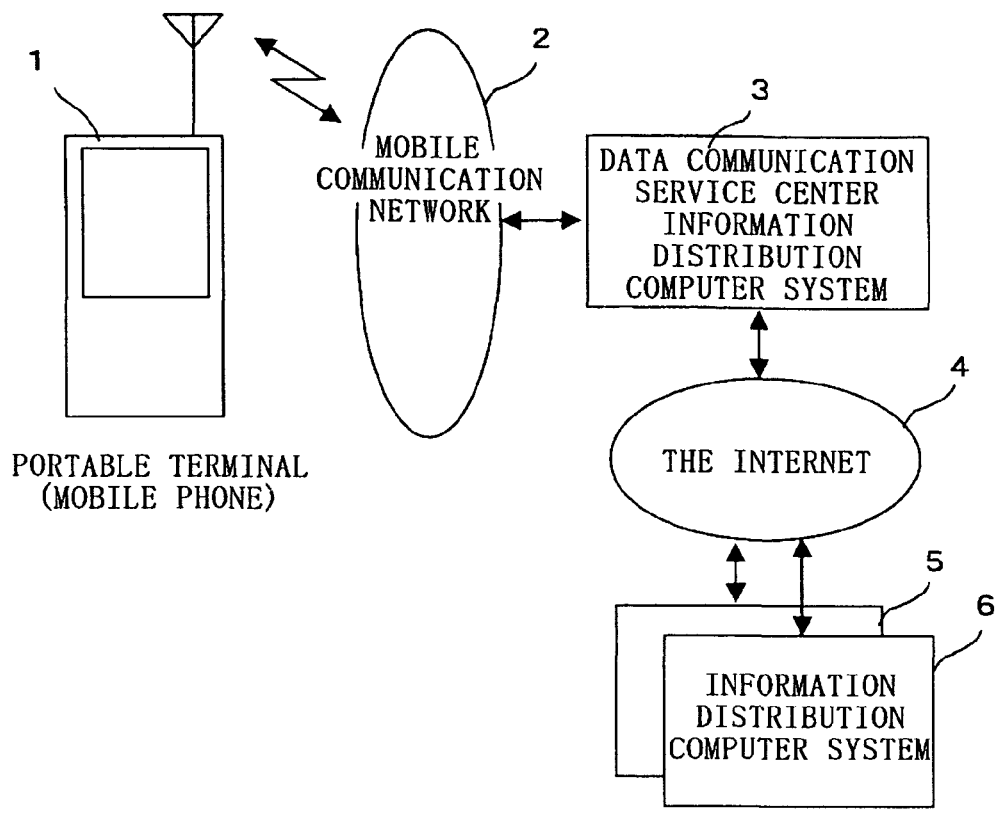
FIG. 10 is a diagram illustrating the configuration of a portable navigation system of prior related art employing a mobile phone as a navigation terminal.

Next, the process for selecting a map in the portable navigation terminal 10 according to the second embodiment of the present invention will be described. FIG. 9 is a flowchart illustrating the procedure for map selection in the portable navigation terminal 10 of FIGS. 3 and 4. First, the traveling speed of the portable navigation terminal 10 is detected by the speed detecting means 104 in step S301. Likewise, in step S301, selection information pertaining to the map currently selected is set aside, for example, in a temporary storage device (not shown), such as RAM of the main control section 107 or the like.

Next, in step S302, a determination is made whether the traveling speed of the portable navigation terminal 10 exceeds the maximum speed limit corresponding to the map currently selected. For example, in the case where the map currently selected is Urban Area Map 2, if the traveling speed of the portable navigation terminal 10 is 15 km/h or greater, control proceeds to step S303, and a map reduced by one level, i.e., Urban Area Map 1, is provisionally selected.

Then, in step S304, a determination is made whether Urban Area Map 1, which has been provisionally selected, will be subjected to auto zoom. This is carried out by referring to the settings in the auto-zoom setting storage means illustrated in FIG. 4. In the example of FIG. 4, since there is no setting to subject Urban Area Map 1 to auto zoom, a NO determination is made, and control returns to step S302 to re-check the traveling speed. If the traveling speed is 25 km/h or greater, Detailed Map 3 is provisionally selected in step S303, and since there is a setting to subject Detailed Map 3 to auto zoom, an OK determination is made, and the map is adjudged as the selected map in step S305.

If the traveling speed of the portable navigation terminal 10 does not exceed the maximum speed limit in step S302, control proceeds to step S306, and a determination is then made whether it is below the minimum speed limit. The processes involved in determining whether the traveling speed of the portable navigation terminal 10 is below the minimum speed limit up to the process of determining the map in step S309 is similar to the processes involved in making a determination as to whether the traveling speed exceeds the maximum speed limit in step 302 up to the process of determining the map in step S305.

In step S306, if it is determined that the traveling speed is not below the minimum speed limit, control proceeds to step S310, and the saved selection information of the map is restored and that map is selected. This is one instance where switching of maps does not occur. Similarly, in the case where there is no auto zoom setting for a map corresponding to the traveling speed of the portable navigation terminal 10, control jumps to step S310, and the saved selection information of the map is restored and that map is selected.

As described in detail above, according to the portable navigation terminal of the present invention in which the appropriate map (any one of wide-range map, mid-range map, detailed map, urban area map) is displayed in accordance with the traveling speed by automatic switching, it is possible to conduct map stopping or stably fix the map being displayed on the display screen at a certain point during travel, and thereby allow the user to view a detailed map pertaining to a specific point or spot during high-speed travel.

What is claimed is:

1. A portable navigation terminal that transmits current position information obtained from a GPS system to an information distribution server, receives map information and route information from the information distribution server, and displays a map and a route on a display section, wherein the portable navigation terminal comprises:
   a speed detecting section for detecting the traveling speed thereof;
   a map data request/acquisition section for requesting and acquiring different types of map data from the information distribution server depending on the traveling speed detected by the speed detecting section;
   an auto-scrolling section for maintaining a current position at the center of a display screen by scrolling the map automatically;
   an operation section including a map stopping button for stopping the change being made in the type of map displayed on the display section at an arbitrary point in time during travel and for stopping the switch to a new map data including the current position even if the current position changes, wherein the map stopping button includes a zoom-in button and a zoom-out button; and
   a map change prohibition section for inhibiting the process of switching the type of map currently displayed on the display section when the map stopping button is operated;
   wherein, if the zoom-in button or the zoom-out button is operated during a valid term of the auto-scroll section, the map change prohibition section inhibits the process of switching the map displayed to a map corresponding to the traveling speed detected by the speed detecting section such that the map currently displayed on the display section continues to be displayed without being substituted by another type of map regardless of the traveling speed of the portable navigation terminal and without switching to the new map data including the current position even if the current position changes, and
   wherein, if the zoom-in button or the zoom-out button is operated during the valid term of the auto-scroll section and during the terminal is actually moving, the auto-scrolling section is made inoperative such that the map currently displayed on the display section continues to be displayed without switching to the new map data including the current position even if the current position changes by the terminal's actual movement.

2. A computer readable medium having a program recorded thereon for causing a computer comprising a portable navigation terminal as claimed in claim 1 to transmit current position information obtained from a GPS system to an information distribution server, receive map information and route information from the information distribution server, and display a map and a route on a display section and execute processes comprising:
   (a) detecting the traveling speed of the portable navigation terminal;
   (b) requesting and acquiring different types of map data from the information distribution server depending on the traveling speed detected by the speed detecting process;
   (c) maintaining the current position at the center of a display screen by scrolling the map automatically; and
   continuing to display the map currently displayed on the display section without substituting the map currently displayed on the display section for another type of map and without switching to a new map data including the current position even if the current position changes, if the zoom-in button or the zoom-out button is activated during a valid term of the step (c), regardless of the traveling speed detected by the speed detecting process, wherein, if the zoom-in button or the zoom-out button is operated during the valid term of the step (c) and during the terminal is actually moving, the step (c) is made inoperative such that the map currently displayed on the display section continues to be displayed without switching to the new map data including the current position even if the current position changes by the terminal's actual movement.

3. The portable navigation terminal according to claim 1, further comprising a GPS receiver, wherein the traveling speed is detected based on the average traveling speed of the portable navigation terminal between two points of the GPS system.

4. The portable navigation terminal according to claim 1, and which is further provided with an acceleration sensor, wherein the portable navigation terminal integrates the output of the acceleration sensor and detects the traveling speed of the portable navigation terminal.

* * * * *